United States Patent
Liu et al.

(10) Patent No.: US 8,681,638 B2
(45) Date of Patent: Mar. 25, 2014

(54) WIRELESS COMMUNICATION SYSTEM

(75) Inventors: Chunmei Liu, Great Falls, VA (US);
Masoud Olfat, Great Falls, VA (US);
Feng Huang, Herndon, VA (US);
Mohammad Hassan Partovi, Potomac, MD (US); David S. McGinniss, Aurora, IL (US)

(73) Assignee: Clearwire IP Holdings LLC, Bellevue, WA (US)

( * ) Notice: Subject to any disclaimer, the term of this patent is extended or adjusted under 35 U.S.C. 154(b) by 840 days.

(21) Appl. No.: 12/533,846

(22) Filed: Jul. 31, 2009

(65) Prior Publication Data

US 2011/0026454 A1 Feb. 3, 2011

(51) Int. Cl.
*H04L 12/26* (2006.01)
*H04W 4/00* (2009.01)

(52) U.S. Cl.
USPC .......................................... 370/242; 455/434

(58) Field of Classification Search
USPC ........................................................ 370/242
See application file for complete search history.

(56) References Cited

U.S. PATENT DOCUMENTS

| | | | |
|---|---|---|---|
| 6,122,753 A * | 9/2000 | Masuo et al. ................... | 714/4.2 |
| 2005/0101326 A1 | 5/2005 | Kang et al. | |
| 2006/0025134 A1 * | 2/2006 | Cho et al. .................. | 455/435.1 |
| 2006/0099972 A1 | 5/2006 | Nair et al. | |
| 2006/0154663 A1 * | 7/2006 | Son et al. .................. | 455/435.1 |
| 2007/0078999 A1 | 4/2007 | Corson et al. | |
| 2007/0083669 A1 | 4/2007 | Tsirtsis et al. | |
| 2007/0140253 A1 * | 6/2007 | Daigle ....................... | 370/395.2 |
| 2007/0298761 A1 | 12/2007 | Hani | |
| 2009/0209254 A1 | 8/2009 | Oguchi | |

OTHER PUBLICATIONS

H. Kang, J. Son, C. Koo, Resource Remain Type for Drop or Ping Pong Call Recovery, Samsung Electronisc Contribution to IEEE 802.16e, Document No. IEEEC802.16e-04/55, pp. 1-5, 7, May 2004.

* cited by examiner

*Primary Examiner* — Shaq Taha

(57) ABSTRACT

A method of operating a communication system comprises exchanging initial communications between a wireless communication device and a communication network over a wireless connection between the wireless communication device and a network access system and over a network connection between the wireless device and the communication network. The method further comprises, in response to a loss of the network connection due to a deterioration of the wireless connection, determining if a partial network entry process is possible to regain the connection, and if the partial network entry process is possible to regain the network connection, performing the partial network entry process. The method further comprises, in response to an improvement of the wireless connection and upon regaining the network connection, exchanging new communications between the wireless communication device and the communication network over the wireless connection and the network connection.

16 Claims, 5 Drawing Sheets

WIRELESS COMMUNICATION SYSTEM

TECHNICAL BACKGROUND

Wireless communication devices commonly communicate at various layers with wireless communication networks. Links established at low layers allow communications to commence at upper layers. The failure of a lower layer link may cause the failure of upper layer links. Upon regaining a lower layer link, a wireless device may be required to perform various processes to regain upper layer links.

In many cases, wireless links may degrade due to various factors or conditions. For example, a wireless device may encounter a coverage hole. Such a degradation of a wireless link may cause upper layer links, such as a network connection, to fail. Upon regaining the wireless link, the wireless device must also regain the network connection. The steps or processes involved in regaining the network connection may cause delay or latency, thereby affecting a user experiences, device performance, or the like.

OVERVIEW

In an embodiment, a method of operating a communication system comprises exchanging initial communications between a wireless communication device and a communication network over a wireless connection between the wireless communication device and a network access system and over a network connection between the wireless device and the communication network. The method further comprises, in response to a loss of the network connection due to a deterioration of the wireless connection, determining if a partial network entry process is possible to regain the connection, and if the partial network entry process is possible to regain the network connection, performing the partial network entry process. The method further comprises, in response to an improvement of the wireless connection and upon regaining the network connection, exchanging new communications between the wireless communication device and the communication network over the wireless connection and the network connection.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
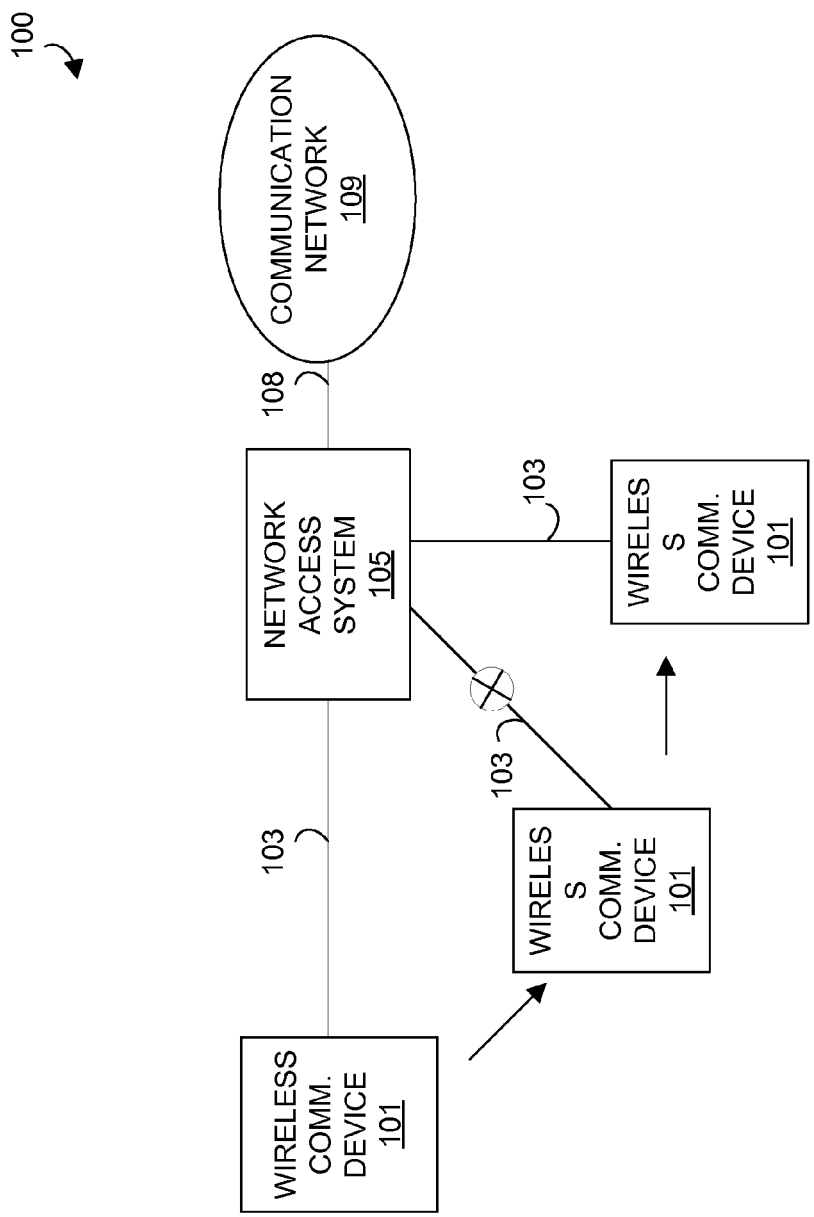
FIG. 1 illustrates a wireless communication system.

FIG. 1 illustrates communication system 100. Communication system 100 includes wireless communication device (wireless device) 101, network access system 105, and communication network 109. Wireless device 101 and network access system 105 communicate over wireless link 103. Network access system 105 and communication network 109 communicate over communication link 108.

Figure 2:
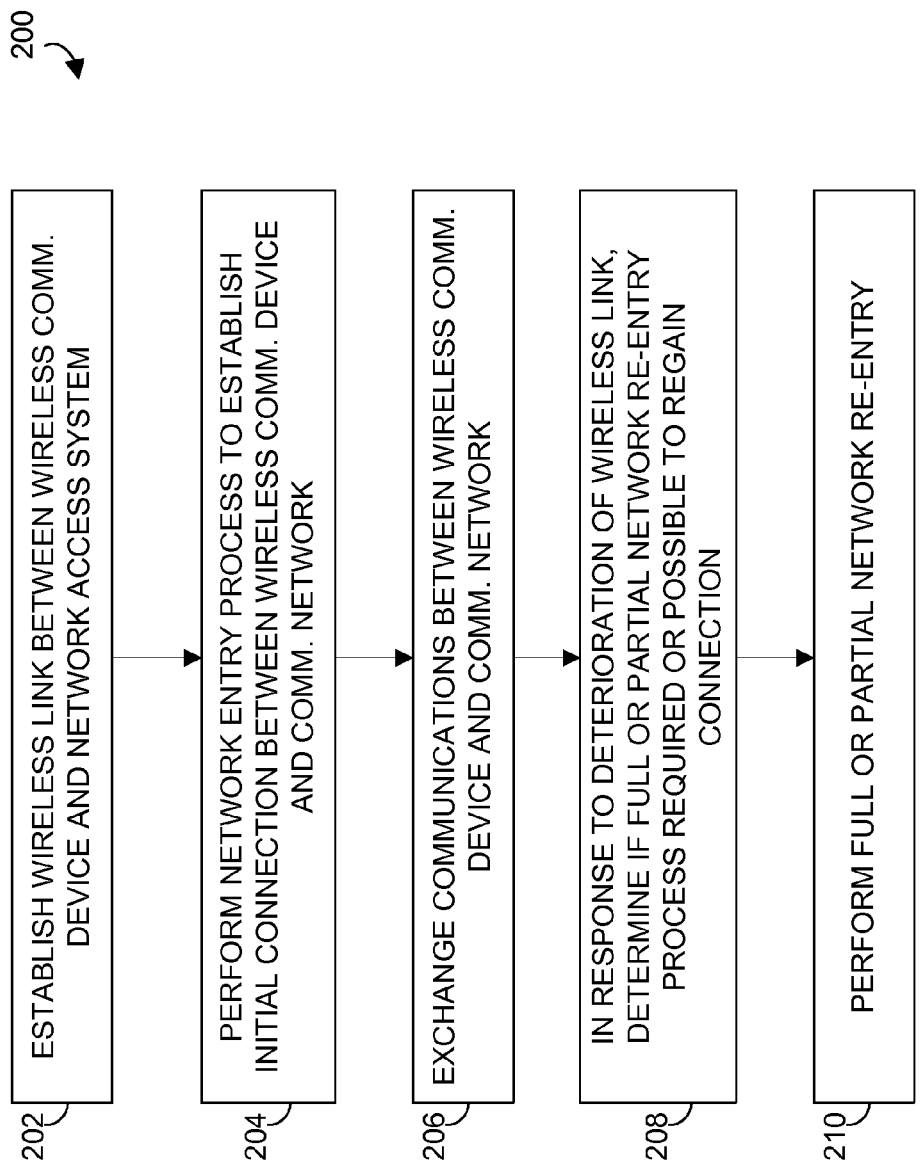
FIG. 2 illustrates the operation of the wireless communication system.

FIG. 2 illustrates process 200 describing the operation of communication system 100. To begin, a wireless link is established between wireless device 101 and network access system 105 (Step 202) and a network entry process is performed to establish an initial connection between wireless device 101 and communication network 109 (Step 204). Communications are exchanged over the wireless link and the network connection between wireless device 101 and communication network 109 (Step 206).

During operation, the wireless link may deteriorate. For example, the wireless link may be dropped, degraded, or otherwise deteriorated to a level insufficient for exchanging communications between wireless device 101 and network access system 105. In response to the deterioration of the wireless link, wireless device 101 determines if a full or partial network re-entry process is required to regain the network connection (Step 208). It should be understood that network access system 105, or some other element in the network, may make this determination. A full network re-entry process may require more steps to be performed than a partial network re-entry process. It would thus be beneficial to perform a partial network re-entry process, if possible.

Upon an improvement of the wireless link between wireless device 101 and network access system 105, either the full or partial network re-entry process is performed to regain the network connection (Step 210). After re-establishing the network connection, wireless device 101 commences with an exchange of communications with communication network 109.

Referring back to FIG. 1, wireless device 101 is any device capable of communicating wirelessly with network access system 105. Wireless device 101 comprises communication interface and processing elements configured to operate as described herein for wireless device 101. Communication interface elements may include an antenna (or antennas) coupled to Radio Frequency (RF) communication circuitry that processes RF signals received over the antenna. The RF communication circuitry typically includes at least an amplifier, filter, modulator, and signal processing circuitry. Wireless device 101 may also include a user interface, memory device, software, processing circuitry, or some other communication components. Wireless communication device 101 may be a phone, computer, e-book, mobile Internet appliance, wireless network interface card, media player, game console, or some other wireless communication apparatus—including variations or combinations thereof.

Network access system 105 comprises RF communication circuitry and an antenna. The RF communication circuitry typically includes an amplifier, filter, RF modulator, and signal processing circuitry. Network access system 105 may also comprise a router, server, memory device, software, processing circuitry, cabling, power supply, network communication interface, structural support, or some other communication apparatus. Network access system 105 could be a base station, Internet access node, telephony service node, wireless data access point, or some other wireless communication system—including variations or combinations thereof.

Communication network 109 comprises any network or collection of networks capable of communicating with network access system 105 over communication link 108.

Examples of communication network 109 include a Wide Area Network (WAN), Local Area Network (LAN), internet, intranet, public switch telephone network (PSTN), wireless communication network, cable multi-service operator (MSO) network, or any combination or variation thereof.

Wireless link 103 uses the air or space as the transport media. Wireless link 103 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Communication link 108 uses metal, glass, air, space, or some other material as the transport media. Communication link 108 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 108 could be a direct link or may include intermediate networks, systems, or devices.

In operation, a user operates wireless communication device 101 to establish communication sessions between wireless device 101 and communication network 109. For example, a user may operate wireless device 101 to place a phone call, check an email account, browse the Internet, or otherwise communicate with a destination via communication network 109.

In order to exchange communications in this manner, wireless communication device 101 first establishes wireless link 103 with network access system 105. Upon establishing wireless link 103, wireless device 101 performs a network entry process to establish an initial network connection with communication network 109. The network entry process may comprise several steps, at the completion of which wireless device 101 is able to exchange communications with communication network 109.

At times, the quality of wireless link 103 may vary. For example, the signal strength of wireless link 103 as measured by wireless device 101 may increase or decrease due to a variety of factors. In fact, the quality of wireless link 103 may suffer so greatly that wireless link 103 is dropped, thereby inhibiting wireless device 101 from exchanging session communications over the network connection with communication network 109.

Referring to FIG. 1, an example is depicted of one such an occurrence whereby wireless link 103 degrades and is dropped. In this illustration, wireless device 101 has initially established wireless link 103 with network access system 105, but then moves to a new location. At the new location, a coverage hole is encountered and wireless link 103 degrades as a result. The coverage hole could be created by a variety of factors, such as buildings, RF interference, or the like. It should be understood that a coverage hole could occur regardless of the movement of wireless device 101.

At some point after encountering the coverage hole, wireless device 101 may move beyond the area experiencing the coverage hole. At this time, wireless device 101 may be able to re-establish wireless link 103. Assuming wireless link 103 is re-established, it may be necessary to re-establish the network connection between wireless device 101 and communication network 109.

Preferably, a partial network re-entry process may be performed to re-establish the network connection as a partial network re-entry process comprises less steps than a full network re-entry process. However, a full network re-entry process may be required. This determination is made by wireless device 101 and either the partial or full re-entry process is performed accordingly. It should be understood that network access system 105 could make this determination, as well as some other element in the communication network. After re-establishing the network connection, wireless device 101 commences with an exchange of communications with communication network 109.

Figure 3:
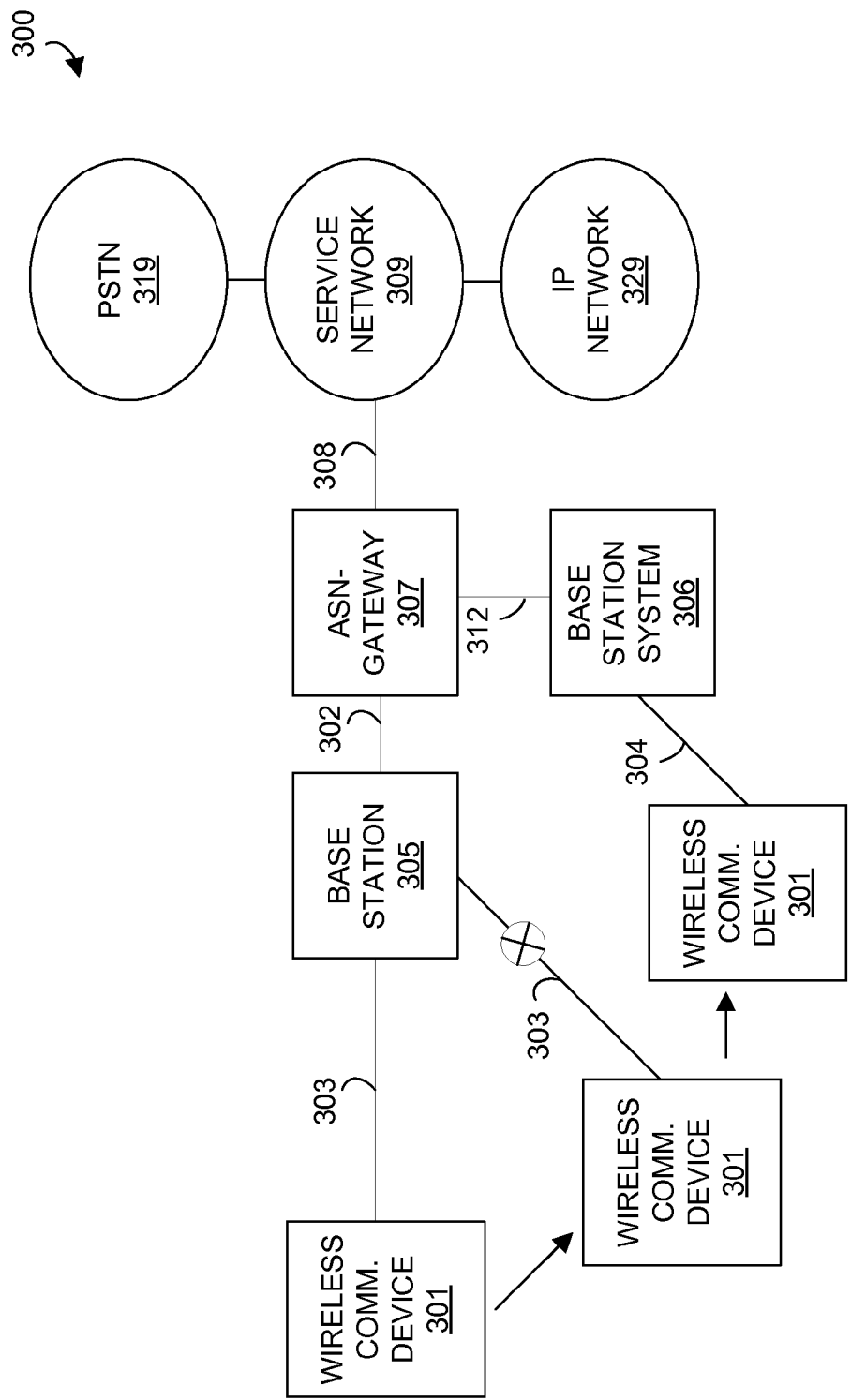
FIG. 3 illustrates a wireless communication system.

FIG. 3 illustrates a network architecture suitable for the WiMax wireless interface protocol. However, it should be understood that other wireless protocols could be use, as well as other network architectures. Examples of other suitable wireless protocols include WCDMA, CDMA2000, CDMA, Evolution Data Only EVDO, GSM, LTE, WIFI, and HSPA, as well as variations and combinations thereof.

Continuing with FIG. 3, communication system 300 is illustrated and includes wireless communication device (wireless device) 301, base station 305, base station 306, access service network (ASN) gateway 307, service network 309, public switched telephone network 319, and Internet Protocol (IP) network 329.

Wireless device 301 and base station 305 communicate over wireless link 303. Base station 305 and access gateway 307 communicate over link 302. Base station system 306 and access gateway system 307 communication over link 312. Access gateway system 307 and communication network 309 communicate over communication link 308.

Wireless device 301 comprises any device capable of communicating with service network 309—and thus, with PSTN 319 and IP network 329—over a wireless interface with base station systems 305 and 306 over an air interface. Mobile phones, portably computers, mobile media devices, and network interface cards are examples of such devices. Wireless device 301 may sometimes be referred to as a mobile station (MS).

Base stations 305 and 306 provide the wireless interface to wireless device 301, over which wireless device 301 exchanges communications with service network 309. Base stations 305 and 306 provide functions such as mobility management, hand off provisioning and control, radio resource management, quality of service enforcement, and session management, as well as other functions.

ASN gateway 307 provides a traffic aggregation point for base stations 305 and 306. Additional functions may include location management and paging, radio resource management and admission control, subscriber profile management, AAA functionality, and quality of service provisioning and management.

Service network 309 provides wireless device 301 with connectivity to IP network 319, and connectivity to PSTN 319. It should be understood that service network 309 could provide connectivity to other networks as well, such as a 3GPP/3GPP2 network, an intranet, LAN, WAN, public networks, corporate networks, or the like. Service network 309 may include elements such as AAA servers that provide authentication and authorization services to devices, such as wireless device 301. Service network 309 handles IP address management, roaming support, location management, and interworking of communications to formats suitable for other networks, such as PSTN 319.

It should be understood that any of the functions described as pertaining to base stations 305 and 306, ASN gateway 307, or service network 309 could reside in or be performed by any of those elements. In addition, the elements themselves could be combined or otherwise contained within each other. For example, ASN gateway could be contained in or combined with at least one of base stations 305 and 306.

Figure 4:
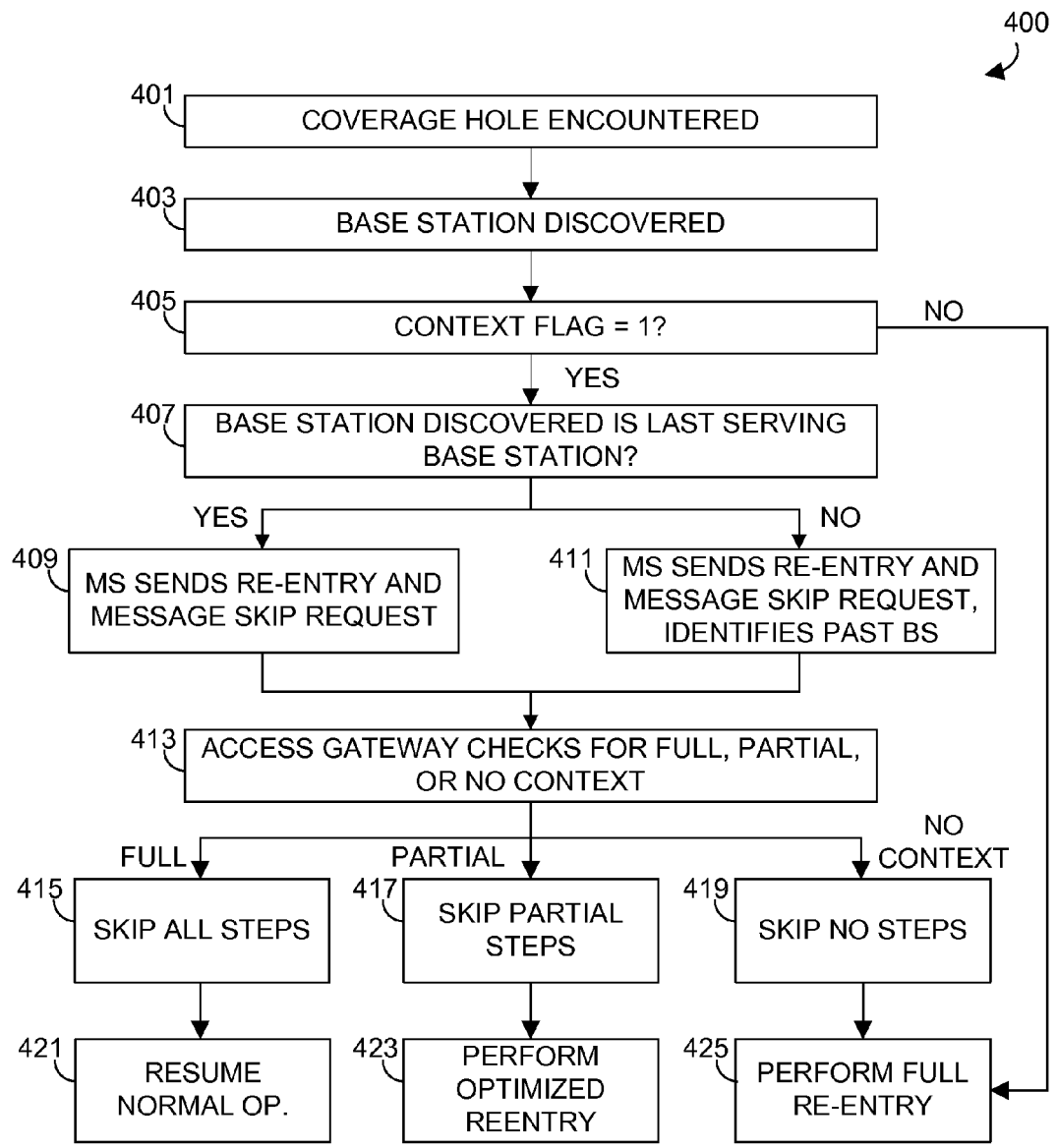
FIG. 4 illustrates the operation of the wireless communication system.

FIG. 4 illustrates process 400 describing the operation of communication system 300. To begin, wireless device 301 has established wireless connection 303 with base station system 305. Wireless connection 303 may be considered a layer 1, or physical layer link. Likewise, wireless device 301 has established a network connection with service network 309 by performing a full network entry process. The full network entry process may include steps such as scanning for downlink channels, synchronizing with the downlink of a serving base station, obtaining uplink parameters, ranging, negotiating basic capabilities, authorization and key exchange, network registration, obtaining an IP address, obtaining time of day, transferring operational parameters, and establishing provisioned parameters. It should be understood that some steps could be omitted and other, different steps included in a full network entry process.

Wireless device 301 is initially located in a geographic area and exchanges communications over the network connection. The network connection may be considered an upper layer link relative to layer 1 link wireless connection 303. For example, the network connection may be a layer 2 or layer 3 connection.

The communications are exchanged using context information that identifies the network connection. Examples of context information include internet protocol (IP) addresses, media access control (MAC) identifiers, base station capabilities, security settings, and the like. Establishing the network connection can be referred to as "entering" a service network that provides wireless device 301 with access service. The access service allows wireless device 301 to communicate over service network 309 with destinations in PSTN 319 or IP network 329. For example, a user operating wireless device 301 may place phone calls, browse the world-wide web, check email, or otherwise utilize voice, video, media, or data services provided by service network 309.

During operation, wireless device 301 moves to a new geographic location and encounters a coverage hole (Step 401). While in the coverage hole, wireless link 303 degrades and is dropped by wireless device 301, or dropped by base station 305, thereby inhibiting wireless device 301 from communicating with base station 305, and by extension, with communication network 309. The coverage hole could be caused by a variety of factors, such as physical obstructions between wireless device 301 and base station 305, as well as RF interference from other devices. Wireless device 301 may detect the coverage hole by lose of physical layer synchronization between itself and base station 305. For example, wireless device 301 may fail to receive a downlink preamble, downlink map, or valid uplink parameters.

Eventually, wireless device 301 leaves the coverage hole, or the coverage hole otherwise subsides, and discovers a base station (Step 403). Upon discovering the base station, wireless device 301 checks the state of a context flag stored in memory (Step 405). The state is set to either a 1 (one) or a zero (0) to indicate whether or not the context information originally obtained when wireless device established the initial network connection has been maintained while wireless device was in the coverage hole. A state of 1 indicates that the context information was maintained. A state of 0 indicates that the context information was not maintained. It should be understood that, while a variety of context information be obtained during the network entry process, the portion of the context information that is obtained proximate in time to when wireless device 301 entered the coverage hole is of high importance. Namely, context information such as base station capabilities may be important as one base station may have different capabilities than another.

If the context flag is set to 0, wireless device 301 performs a full network entry (Step 425) before commencing communications. If the context flag is set to 1, wireless device 301 determines if the recently discovered base station is the last serving base station—base station 305—or is otherwise a newly discovered base station—e.g. base station 306 (Step 407). The base station may be identified by a base station identifier included in a pilot signal transmitted by the base station. Other well known ways to identify the base station are possible.

If the recently discovered base station is base station 305, wireless device 301 sends a re-entry and message skip request requesting re-entry into the network, thereby regaining the network connection and allowing wireless device 301 to once again communicate with service network 309 (Step 409).

If the recently discovered base station is not base station 305, but rather is newly discovered base station 306, then wireless device 301 sends a re-entry and message skip request that identifies the last serving base station—base station 305 (Step 411). Wireless device 301 may identify the base station by a base station identifier (ID), or the like, included in the re-entry message. This allows the newly discovered base station to retrieve the context information from the last serving base station. The skip message indicates that wireless device 301 assumes the network has maintained some—if not all—of the context information and at least portions of a re-entry process may be skipped.

The serving base station—base station 305 or base station 306—receives the re-entry and skip request and checks if full, partial, or no context information was maintained while wireless device 301 was in the coverage hole (Step 413). The serving base station informs wireless device 301 which steps—if any—may be skipped relative to the full entry steps described above for the initial entry of wireless device 301 into the network. If full context information was maintained, then all re-entry steps can be skipped (Step 415)—meaning that none of the full entry steps are performed—and wireless device 301 resumes normal operations with the network (Step 421). If only partial context information was maintained, then wireless device 301 skips some re-entry steps, or partial steps (Step 417)—meaning that less than the full network entry steps are performed—and performs an optimized re-entry process comprising the partial steps (Step 423). For example, the step of obtaining an IP address may be skipped. If no context information was maintained, then no steps are skipped (Step 419) and all of the full network entry steps are performed (Step 425).

Figure 5:
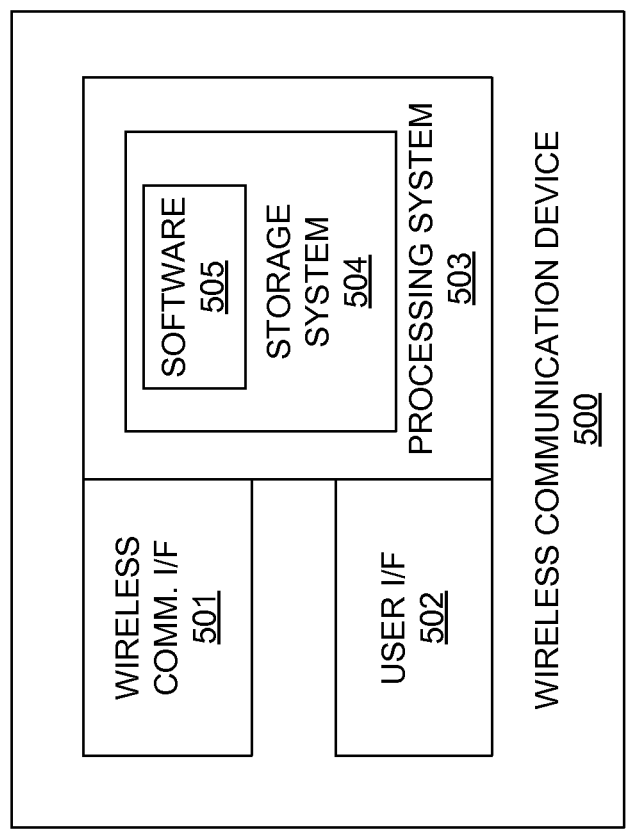
FIG. 5 illustrates a wireless communication device.

FIG. 5 illustrates wireless communication device 500. Wireless communication device 500 is an example of wireless communication device 101, and 301, although device 101 and 301 could use alternative configurations. Wireless communication device 500 comprises wireless communication interface 501, user interface 502, and processing system 503. Processing system 503 is linked to wireless communication interface 501 and user interface 502. Processing system 503 includes processing circuitry and storage system 504 that stores software 505. Wireless communication device 500 may include other well-known components such as a battery and enclosure that are not shown for clarity. Wireless communication device 500 may be a mobile phone, computer, e-book, mobile Internet appliance, media player, game console, wireless network interface card, or some other wireless communication apparatus—including variations or combinations thereof.

Wireless communication interface 501 comprises at least an antenna and RF communication circuitry. The RF communication circuitry typically includes an amplifier, filter, RF modulator, and signal processing circuitry. Wireless communication interface 501 may also include a memory device, software, processing circuitry, or some other communication device. Wireless communication interface 501 may use various protocols, such as WIMAX, CDMA, CDMA2000, WCDMA EVDO, GSM, LTE, WIFI, HSPA, or some other wireless communication format to communicate wirelessly with base stations.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. User interface 502 may be omitted in some examples.

Processing system 503 may comprise a microprocessor and other circuitry that retrieves and executes software 505 from storage system 504. Storage system 504 comprises a disk drive, flash drive, data storage circuitry, or some other memory apparatus. Processing system 503 is typically mounted on a circuit board that may also hold storage system 504 and portions of communication interface 501 and user interface 502. Software 505 comprises computer programs, firmware, or some other form of machine-readable processing instructions. Software 505 may include an operating system, utilities, drivers, network interfaces, applications, or some other type of software. When executed by processing system 503, software 505 directs processing system 503 to operate wireless communication device 500 as described herein for wireless device 101 and 303.

In particular, software 505, when executed by processing system 503, directs processing system 503 to perform a network entry process to establish a network connection between wireless device 500 and a communication network. Wireless communication interface 501 exchanges initial communications with a network access system or base station and the communication network over a wireless connection and the network connection established with the communication network.

In response to a loss of the network connection due to a deterioration of the wireless connection, software 505, when executed by processing system 503, directs processing system 503 to determine if a full network entry process is required to regain the network connection or if a partial network entry process is possible to regain the connection. If the full network entry process is required to regain the network connection, processing system 503 performs the full network entry process. If the partial network entry process is possible to regain the network connection, processing system 503 performs the partial network entry process.

In response to an improvement of the wireless connection and upon regaining the network connection, wireless communication interface 501 exchanges new communications with the communication network over the wireless connection and the network connection.

The following describes new signaling to be exchanged between a mobile station (MS) and a base station (BS) utilizing TLVs for RNG-REQ and RNG-RSP messages defined in WiMAX standard IEEE 802.16e.

When notifying the network that an entry is a re-entry, a mobile station should notify the network that this entry is a re-entry utilizing a Network Re-entry bit of the Ranging Purpose Indication TLV in RNG-REQ (existing TLV). This bit is bit #0 of Ranging Purpose Indication TLV, and is defined for handover scenario for active mobile stations in IEEE 802.16e and can be set to 1 to indicate network re-entry in coverage hole scenarios.

When notifying the network of its previous serving base station, a mobile station should notify the network of its previous serving BS before it had entered the coverage hole utilizing Serving BSID TLV in RNG-REQ (existing TLV). This is an existing TLV, and is defined for a handover scenario for active mobile stations in current IEEE 802.16e, which indicates the BS to which the MS is currently connected before the handover is attempted. For coverage hole scenarios, this can be extended to be the MS's last serving BS before entering into a coverage hole.

To request if one or more network entry steps could be omitted, a mobile station may utilized a Message Skip Request bit of the Ranging Purpose Indication TLV in RNG-REQ. This is defined to be bit #2 of the Ranging Purpose Indication TLV in RNG-REQ. This bit is set to be 1 when the MS comes back into coverage to ask for network entry steps that can be omitted.

The BS should notify the MS which network entry steps could be omitted utilizing a Message Skip Response TLV and HO Process Optimization TLV in RNG-RSP. This new TLV in RNG-RSP may be referred to as a Message Skip Response TLV. The value 0x00, 0x01 and 0x10 mean no, partial, and all messages after ranging can be omitted, respectively. When the Message Skip Response TLV is set to be 0x01, which means that the network has partial of the MS context, the HO Process Optimization TLV is included to indicate network re-entry process management messages that can be omitted.

In an example utilizing the above signaling mechanisms, when the MS comes back into coverage, the MS checks its Context Flag F. If F=0, the MS performs full network entry. If F=1, the MS and the network exchange key information through RNG-REQ/RSP messages. There are three outcomes: no, partial, or all network entry management messages that can be omitted after ranging. The MS and the network fully utilize available context information for completing network re-entry and resuming normal operation. Depending on the outcome of the previous two steps, the MS and the network conduct different operations as below: Full network entry when no messages can be omitted, or when F=0; Optimized network re-entry when partial messages can be omitted as specified in HO Process Optimization TLV in RNG-RSP; or resume normal operation when all messages can be omitted The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
 exchanging initial communications between a wireless communication device and a communication network over a wireless connection between the wireless communication device and a network access system and over a network connection between the wireless device and the communication network;
 discovering the network access system after a loss of the network connection due to a deterioration of the wireless connection between the wireless communication device and the network access system, wherein the wireless device checks a state of a context flag stored in memory after the loss of the network connection due to the deterioration of the wireless device;

determining at the wireless device a type of network entry process required to regain the network connection based on the context flag stored in memory, wherein the context flag is indicative of whether context information was maintained during the deterioration of the wireless connection between the wireless communication device and the network access system;

initiating at the wireless communication device a network entry process with the network access system based on the context flag to re-establish the network connection where the initiated network entry process is selected from a full network entry process, a partial network entry process, and a full network re-entry process, wherein all network entry steps are required to re-establish the network connection during the full network entry process, some network entry steps are required and some network entry steps are skipped to re-establish the network connection during the partial network entry process, and none of the network entry steps are required to re-establish the network connection during the full network re-entry process;

exchanging new communications between the wireless communication device and the communication network over the wireless connection and the network connection after the network connection is re-established.

2. The method of claim 1, wherein the context flag indicates the full network entry process is required if the context information is not maintained, the context flag indicates the partial network entry process is possible if some of the context information is maintained, and the context flag indicates the full network re-entry process is possible when all of the context information is maintained.

3. The method of claim 2 further comprising establishing the wireless connection between the wireless communication device and the network access system, and performing a network entry process over the wireless connection to establish the network connection between the wireless communication device and the communication network before exchanging initial communications between the wireless communication device and the communication network.

4. The method of claim 3 wherein the network entry process further comprises determining which network entry steps are skipped when the network entry process is the partial network entry process.

5. The method of claim 1 wherein the deterioration of the wireless connection occurs due to a coverage hole encountered by the wireless communication device.

6. The method of claim 1 wherein the wireless connection comprises a layer one connection and wherein the network connection comprises a layer three connection.

7. The method of claim 1 wherein exchanging the initial communications comprises exchanging the initial communications in accordance with a wireless communication protocol.

8. The method of claim 7 wherein the wireless communication protocol comprises at least one of Worldwide Inter-operability for Microwave Access (WiMAX) and Long Term Evolution (LTE).

9. A communication system comprising:
a communication network;
a network access system in communication with the communication network and configured to provide access to the communication network; and,
a wireless communication device in communication with the network access system over a wireless connection and configured to:
perform a network entry process over the wireless connection to establish a network connection with the communication network;
exchange initial communications with the communication network over the wireless connection and the network connection;
discover the network access system after a loss of the network connection due to a deterioration of the wireless connection, wherein the wireless device checks a state of a context flag stored in memory after discovering the network access system;
determine a type of network entry process required to regain the connection based on the context flag stored in memory, wherein the context flag is indicative of whether context information was maintained during the deterioration of the wireless connection between the wireless communication device and the network access system;
initiate a network entry process with the network access system based on the context flag to re-establish the network connection where the initiated network entry process is selected from a full network entry process, a partial network entry process, and a full network re-entry process, wherein all network entry steps are required to re-establish the network connection during the full network entry process, some network entry steps are required and some network entry steps are skipped to re-establish the network connection during the partial network entry process, and none of the network entry steps are required to re-establish the network connection during the full network re-entry process;
exchange new communications with the communication network over the wireless connection and the network connection after the network connection is re-established.

10. The communication system of claim 9 wherein the context flag indicates the full network entry process is required if the context information is not maintained, the context flag indicates the partial network entry process is possible if the context information is maintained, and the context flag indicates the full network re-entry process is possible when all of the context information is maintained.

11. The communication system of claim 10 wherein the network entry process further comprises determining which network entry steps are skipped when the network entry process is the partial network entry process.

12. The communication system of claim 9 wherein the deterioration of the wireless connection occurs due to a coverage hole encountered by the mobile communication device.

13. The communication system of claim 9 wherein the wireless connection comprises a layer one connection and wherein the network connection comprises a layer three connection.

14. The communication system of claim 9 wherein exchanging the initial communications comprises exchanging the initial communications in accordance with a wireless communication protocol.

15. The communication system of claim 14 wherein the wireless communication protocol comprises at least one of Worldwide Inter-operability for Microwave Access (WiMAX) and Long Term Evolution (LTE).

16. A wireless communication device comprising:
a communication interface configured to exchange initial communications with a network access system and a communication network over a wireless connection and a network connection established with the communication network; and,
a processing system coupled to the communication interface and configured to:
- perform a network entry process to establish the network connection with the communication network;
- discover the network access system after a loss of the network connection due to a deterioration of the wireless connection, wherein the wireless device checks a state of a context flag stored in memory after discovering the network access system;
- determine a type of network entry process required to regain the network connection based on the context flag maintained at the wireless device, wherein the context flag is indicative of whether context information was maintained during the deterioration of the wireless connection between the wireless communication device and the network access system;
- initiate a network entry process with the network access system based on the context information to re-establish the network connection where the initiated network entry process is selected from a full network entry process, a partial network entry process, and a full network re-entry process, wherein all network entry steps are required to re-establish the network connection during the full network entry process, some network entry steps are required and some network entry steps are skipped to re-establish the network connection during the partial network entry process, and none of the network entry steps are required to re-establish the network connection during the full network re-entry process; and
- exchange new communications with the communication network over the wireless connection and the network connection after the network connection is re-established.

* * * * *